US012198639B2

(12) United States Patent
Liao et al.

(10) Patent No.: US 12,198,639 B2
(45) Date of Patent: Jan. 14, 2025

(54) DISPLAY PANEL ASSEMBLY, DRIVING METHOD THEREOF AND DISPLAY APPARATUS

(71) Applicants: Chengdu BOE Optoelectronics Technology Co., Ltd., Sichuan (CN); BOE TECHNOLOGY GROUP CO., LTD., Beijing (CN)

(72) Inventors: Chenghao Liao, Beijing (CN); Guoqiang Wu, Beijing (CN); Shuai Hou, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/028,535

(22) PCT Filed: Jun. 16, 2022

(86) PCT No.: PCT/CN2022/099099

§ 371 (c)(1),
(2) Date: Mar. 25, 2023

(87) PCT Pub. No.: WO2023/240522

PCT Pub. Date: Dec. 21, 2023

(65) Prior Publication Data

US 2024/0355297 A1 Oct. 24, 2024

(51) Int. Cl.
*G09G 3/3291* (2016.01)
*G09G 3/3225* (2016.01)

(52) U.S. Cl.
CPC ......... *G09G 3/3291* (2013.01); *G09G 3/3225* (2013.01); *G09G 2300/0452* (2013.01);
(Continued)

(58) Field of Classification Search
None
See application file for complete search history.

(56) References Cited

U.S. PATENT DOCUMENTS 10,026,347 B2 * 7/2018 Xu ........................... G09G 3/20
10,748,983 B2 * 8/2020 Li ........................ G09G 3/3266
(Continued)

*Primary Examiner* — Fred Tzeng
(74) *Attorney, Agent, or Firm* — HOUTTEMAN LAW LLC

(57) ABSTRACT

A display panel assembly includes a display panel and driving devices. The display panel includes first multiplexers; each first multiplexer is configured to control the first load connection terminal (N11) to be electrically coupled to one of two first data lines (S1), and to control the second load connection terminal (N12) to be electrically coupled to the second or third data line (S2 or S3); each driving device includes data signal generators, and second multiplexers; each second multiplexer is configured to control the first signal generating terminal (N21) to be electrically coupled to one of the two first data signal generators, and control the second signal generating terminal (N22) to be electrically coupled to the second or third data signal generator; and the first and second load connection terminals (N11, N12) are electrically coupled to the first and second signal generating terminals (N21, N22), respectively.

20 Claims, 10 Drawing Sheets

(52) U.S. Cl.
CPC ............... *G09G 2300/0819* (2013.01); *G09G 2300/0842* (2013.01); *G09G 2300/0861* (2013.01); *G09G 2310/0291* (2013.01); *G09G 2310/0297* (2013.01); *G09G 2310/08* (2013.01); *G09G 2330/04* (2013.01)

(56) References Cited

U.S. PATENT DOCUMENTS

| | | | | |
|---|---|---|---|---|
| 10,802,351 | B2* | 10/2020 | Hao | G09G 3/36 |
| 11,270,658 | B2* | 3/2022 | Lang | G09G 3/3607 |
| 2007/0279372 | A1* | 12/2007 | Brown Elliott | G09G 3/3426 345/102 |
| 2009/0027426 | A1* | 1/2009 | Guiliemot | G09G 3/2085 345/204 |
| 2011/0063525 | A1* | 3/2011 | Chiou | G09G 3/20 348/739 |
| 2017/0103700 | A1* | 4/2017 | Wang | G09G 3/30 |
| 2019/0347976 | A1* | 11/2019 | Um | G09G 3/2074 |
| 2020/0226972 | A1* | 7/2020 | Chen | G09G 3/3677 |
| 2021/0174724 | A1* | 6/2021 | Li | G09G 3/2003 |
| 2021/0335279 | A1* | 10/2021 | Yang | G09G 3/3275 |
| 2021/0356785 | A1* | 11/2021 | Yuan | G09G 3/3685 |
| 2022/0157233 | A1* | 5/2022 | Zheng | G09G 3/3208 |
| 2022/0157259 | A1* | 5/2022 | Wang | G09G 3/3266 |
| 2022/0208874 | A1* | 6/2022 | Zhang | H10K 59/121 |
| 2022/0236615 | A1* | 7/2022 | Zeng | G02F 1/136254 |
| 2022/0334440 | A1* | 10/2022 | Wu | H10K 59/131 |
| 2022/0366854 | A1* | 11/2022 | Shao | G09G 3/3258 |
| 2023/0027375 | A1* | 1/2023 | Zhang | G06F 3/0412 |
| 2023/0050569 | A1* | 2/2023 | Dong | G09G 3/3233 |
| 2024/0127724 | A1* | 4/2024 | Zhang | G09G 3/001 |

* cited by examiner

DISPLAY PANEL ASSEMBLY, DRIVING METHOD THEREOF AND DISPLAY APPARATUS

CROSS-REFERENCE TO RELATED APPLICATION

This is a National Phase Application filed under 35 U.S.C. 371 as a national stage of PCT/CN2022/099099, filed on Jun. 16, 2022, the contents of which are incorporated herein in their entirety by reference.

TECHNICAL FIELD

The present disclosure belongs to the field of display technology, in particular relates to a display panel assembly, a driving method for a display panel assembly and a display apparatus.

BACKGROUND

As a refresh rate (the number of frames displayed per second) and a resolution (the number of pixels in a display apparatus) of a display apparatus increase, the time required for displaying each frame becomes shorter and shorter, and the charging time for each row of pixels (e.g., sub-pixels coupled to the same gate line) in each frame also becomes shorter and shorter. For example, for a display apparatus with the resolution of 1440*3200, the theoretical charging time for each row of sub-pixels is only 2.6 us at the refresh rate of 120 Hz, whereas the actual allowable charging time is shorter due to factors such as data processing (Panel Loading) and the like.

Thus, in the related art, a driving capability of a driving module (e.g., a data driver chip) is insufficient, and thus the sub-pixels cannot be sufficiently charged in such a short time.

SUMMARY

The present disclosure provides a display panel assembly, a driving method for a display panel assembly and a display apparatus.

In a first aspect, an embodiment of the present disclosure provides a display panel assembly, including a display panel and a plurality of driving devices: wherein the display panel includes a plurality of data lines, a plurality of sub-pixels, a plurality of first multiplexers, and a plurality of load connection terminals; each first multiplexer is coupled to at least two load connection terminals and at least four data lines: the at least two load connection terminals include a first load connection terminal and a second load connection terminal: the at least four data lines include two first data lines coupled to sub-pixels of a first color, a second data line coupled to sub-pixels of a second color, and a third data line coupled to sub-pixels of a third color: the first multiplexer is configured to control the first load connection terminal to be electrically coupled to one of the two first data lines, and to control the second load connection terminal to be electrically coupled to the second data line or the third data line: each driving device includes a plurality of data signal generators configured to generate data signals, a plurality of second multiplexers corresponding to the plurality of first multiplexers and a plurality of signal generating terminals: each second multiplexer is coupled to at least two signal generating terminals and at least four data signal generators: the at least two signal generating terminals include a first signal generating terminal and a second signal generating terminal: the at least four data signal generators include two first data signal generators corresponding to the first data lines, a second data signal generator corresponding to the second data line, and a third data signal generator corresponding to the third data line: the second multiplexer is configured to control the first signal generating terminal to be electrically coupled to one of the two first data signal generators, and to control the second signal generating terminal to be electrically coupled to the second data signal generator or the third data signal generator; and the first load connection terminal and the second load connection terminal, to which the first multiplexer is coupled, are electrically coupled to the first signal generating terminal and the second signal generating terminal, to which the corresponding second multiplexer is coupled, respectively.

In some embodiments, each second multiplexer includes two first multiplexing switches, a second multiplexing switch, and a third multiplexing switch: the two first multiplexing switches are coupled between the two first data signal generators and the first signal generating terminal, respectively: the second multiplexing switch is coupled between the second data signal generator and the second signal generating terminal, and the third multiplexing switch is coupled between the third data signal generator and the second signal generating terminal.

In some embodiments, each first multiplexer includes two multiplexing groups, each multiplexing group includes two multiplexing switches: the two multiplexing switches of one of the two multiplexing groups are respectively coupled between the first load connection terminal and the two first data lines, and the two multiplexing switches of the other of the two multiplexing groups are respectively coupled between the second load connection terminal and the second and third data lines; and in each multiplexing group, one of the two multiplexing switches is controlled by a first switching control signal, and the other of the two multiplexing switches is controlled by a second switching control signal.

In some embodiments, each driving device further includes a line buffer; and the line buffer is configured to control the data signal generators to generate corresponding data signals according to display content data.

In some embodiments, each driving device further includes a plurality of signal amplifiers; and the plurality of signal amplifiers are configured to amplify data signals generated by the data signal generators.

In some embodiments, the plurality of signal amplifiers are coupled between the second multiplexer and the signal generating terminals.

In some embodiments, the display panel assembly further includes a plurality of load switches: the plurality of load switches are coupled between the signal generating terminals and the corresponding data lines; and the plurality of load switches are configured to control the signal generating terminals to be electrically coupled to the corresponding data lines.

In some embodiments, the plurality of load switches are coupled between the signal generating terminals and the corresponding load connection terminals.

In some embodiments, the plurality of load switches are in a driver chip; and the driver chip includes a plurality of output ports: the signal generating terminals are coupled to the plurality of output ports through the plurality of load switches.

In some embodiments, the driver chip further includes a plurality of electro-static discharge elements; and the plurality of electro-static discharge elements are configured to prevent signals of the plurality of output ports from being reversely transmitted to the plurality of load switches.

In some embodiments, each electro-static discharge element includes a first diode and a second diode: an anode of the first diode is supplied with a low voltage signal, and a cathode of the first diode is coupled to the output port: a cathode of the second diode is supplied with a high voltage signal, and an anode of the second diode is coupled to the output port.

In some embodiments, the plurality of load switches are in the display panel; and the display panel includes a plurality of input connectors: the load connection terminals are coupled to the plurality of input connectors through the plurality of load switches.

In some embodiments, all the load switches are controlled by one load control signal.

In some embodiments, the first color is green; and one of the second color and the third color is red, and the other one is blue.

In some embodiments, the plurality of data lines extend in a column direction: the plurality of data lines are arranged sequentially along a row direction; and the four data lines, to which each first multiplexer is coupled, are four adjacent data lines.

In some embodiments, the display panel is an organic light emitting diode display panel.

In a second aspect, an embodiment of the present disclosure provides a driving method for a display panel assembly, the display panel assembly is the display panel assembly of any one of the embodiments of the present disclosure: the method includes inputting a data signal to a sub-pixel: wherein inputting the data signal to the sub-pixel includes: controlling a corresponding data signal generator to generate a data signal according to display content data of the sub-pixel; and controlling a second multiplexer to electrically couple the corresponding data signal generator to a signal generating terminal, and controlling a first multiplexer to electrically couple the corresponding signal generating terminal to a data line, to which the sub-pixel is coupled.

In some embodiments, the display panel assembly is the display panel assembly provided with the load switches: the method further includes: controlling the load switches to be switched off when or before the data signal generators start to generate the data signals; and controlling the load switches to be turned on when or after a voltage of the signal generating terminals reaches a voltage of the data signal.

In some embodiments, the data signal is input to the sub-pixel at a predetermined signal refresh timing; and the data signal generator starts to generate the data signal at a predetermined time before the signal refresh timing, so that a voltage at the signal generating terminal reaches the voltage of the data signal at or before the signal refresh timing.

In a third aspect, an embodiment of the present disclosure provides a display apparatus, including the display panel assembly of any one of the embodiments of the present disclosure.

Figure 1:
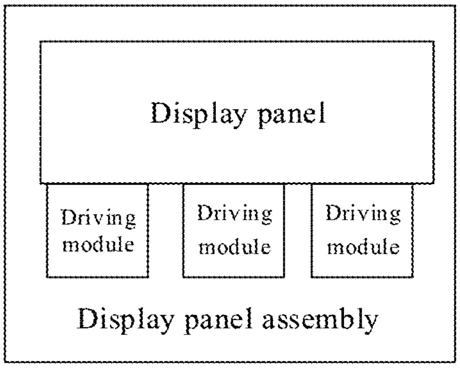
FIG. 1 is a block diagram of a display panel assembly according to an embodiment of the present disclosure.
Figure 2:
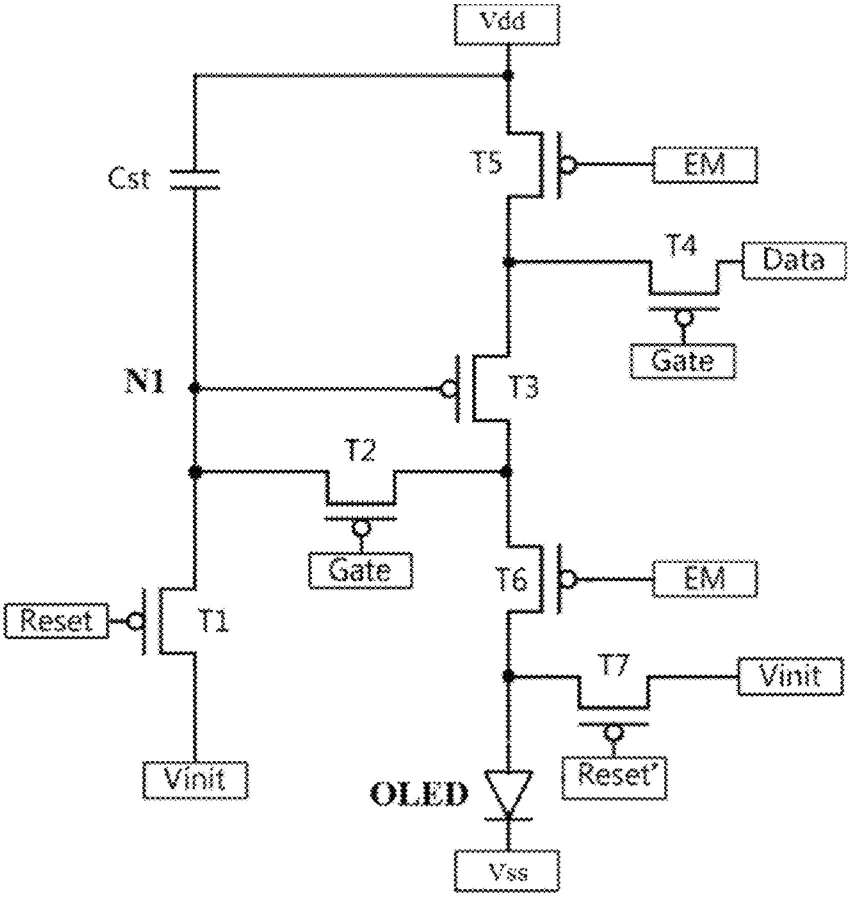
FIG. 2 is a circuit diagram of a pixel circuit in a display panel assembly according to an embodiment of the present disclosure.

The reference signs have the following meanings: 1, sub-pixel: S1, first data line; S2, second data line: S3, third data line: N11, first load connection terminal: N12, second load connection terminal: N21, first signal generating terminal: N22, second signal generating terminal: K, multiplexing switch: K1, first multiplexing switch: K2, second multiplexing switch: K3, third multiplexing switch: K9, load switch: D1, first diode: D2, second diode: T1, first transistor: T2, second transistor; T3, third transistor; T4, fourth transistor: T5, fifth transistor; T6, sixth transistor; T7, seventh transistor: Cst, storage capacitor: Reset, first reset terminal: Reset', second reset terminal: Vinit, initialization terminal: Gate, gate line terminal: Data, data line terminal; EM, control terminal: Vdd, anode signal terminal: Vss, cathode signal terminal.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

It is to be understood that the specific embodiments and drawings described herein are merely illustrative of the present disclosure and do not limit the present disclosure.

It is to be understood that the various embodiments of the present disclosure and the various features of the embodiments may be combined with each other without conflict.

It is to be understood that for convenience of description, only portions related to embodiments of the present disclosure are shown in the drawings of the present disclosure, and portions not related to embodiments of the present disclosure are not shown in the drawings.

In a first aspect, referring to FIGS. 1 to 11, an embodiment of the present disclosure provides a display panel assembly, including a display panel and a plurality of driving modules.

Referring to FIG. 1, the display panel assembly according to an embodiment of the present disclosure includes the display panel capable of displaying, and the plurality of driving modules coupled to the display panel.

The display panel is a device capable of displaying under the driving of a driving signal.

The display panel may include a plurality of sub-pixels 1 arranged in an array, and each sub-pixel 1 may be a minimum unit capable of independently displaying desired contents.

For example, the display panel may include a plurality of data lines (source lines) and a plurality of gate lines, for example: each sub-pixel 1 is coupled to one data line and one gate line.

For example, in each frame, the plurality of gate lines may be turned on by turns, to control the sub-pixels 1 coupled to the plurality of gate lines to be electrically coupled to the corresponding data lines; and when the data lines are electrically coupled to the corresponding sub-pixels 1, the data lines may write the corresponding data signals (VDATA, or data voltage) into the corresponding sub-pixels 1, so that the sub-pixels 1 may display contents in the frame according to the data signals.

For example, each data line extends in a column direction, and each gate line may extend in a row direction, so that the data lines and the gate lines intersect with each other and are respectively coupled to the sub-pixels 1 at the intersection, i.e., each data line may be coupled to a column of sub-pixels 1 in the array, and each gate line may be coupled to a row of sub-pixels 1 in the array.

For example, the row direction and the column direction may be perpendicular to each other.

It should be understood that in the embodiments of the present disclosure, the row direction and the column direction only indicate two directions intersecting with each other in relative terms, so that the row direction and the column direction are not related to the placement of the display panel, and the row direction and the column direction are not necessarily perpendicular to each other.

In some embodiments, the display panel is an organic light emitting diode display panel.

As an implementation of the embodiment of the present disclosure, the display panel in the display panel assembly of the embodiment of the present disclosure may be an organic light emitting diode display surface, that is, one organic light emitting diode (OLED) is provided in each sub-pixel 1 of the display panel as a light emitting (display) device.

Each sub-pixel 1 may further include a pixel circuit for driving the organic light emitting diode to emit light. For example, referring to FIG. 2, each pixel circuit may have a 7TIC structure (i.e., including 7 transistors and 1 capacitor). Specifically, each pixel circuit includes a first transistor T1, a second transistor T2, a third transistor T3 (i.e., a driving transistor), a fourth transistor T4, a fifth transistor T5, a sixth transistor T6, a seventh transistor T7, a storage capacitor Cst, and a first reset terminal Reset, a second reset terminal Reset', an initialization terminal Vinit, a gate line terminal Gate (coupled to a gate line), a data line terminal Data (coupled to a data line), a control terminal EM, an anode signal terminal Vdd, a cathode signal Vss, and the like, coupled to other signal lines. The transistors are transistors of the same type, such as P-type transistors (e.g. PMOS) or N-type transistors (e.g. NMOS). Alternatively, the transistors may be partially P-type transistors (e.g., PMOS) and partially N-type transistors (e.g., NMOS).

It should be understood that in the embodiment of the present disclosure, the pixel circuit of the sub-pixel 1 is not limited to the above form: the display panel in the embodiments of the present disclosure is not limited to the organic light emitting diode display panel. For example, the display panel may also be other forms such as a liquid crystal display panel (LCD).

The driving module is coupled to the display panel and used for providing driving signals for the display panel.

For example, as an implementation of the embodiment of the present disclosure, the driving module may be a driver IC, i.e., a chip (IC) that may be coupled to the display panel.

The driver chip in the embodiment of the present disclosure includes a driver chip for supplying a data signal to the sub-pixel 1 (data line), and thus may also be referred to as a data driver IC (DIC).

It should be understood that the display panel assembly may also include a driver chip for providing other signals, such as a gate driver chip (gate driver IC) for providing gate driving signals to the gate lines.

The driver chip may include a plurality of output ports, such as a plurality of pins, and the output ports are coupled to traces in the driver chip, so as to output driving signals. The display panel may include a plurality of input connectors, such as a plurality of pads, and the input connectors are coupled to the gate lines and the data lines in the display panel. Therefore, when the driver chip is coupled to the display panel, the driving signal generated by the driver chip may be provided for the display panel by electrically connecting the output ports with the input connectors.

The driver chip and the display panel are coupled to each other in various ways. For example, the driver chip may be directly bonded to the display panel (e.g., an array substrate of the display panel), so that the output ports of the driver chip are also directly electrically coupled to the input connectors of the display panel: for another example, the display panel may be bond to a flexible printed circuit (FPC), and the driver chip may be coupled to the flexible printed circuit, so that the output ports of the driver chip are electrically coupled to the input connectors of the display panel through traces on the flexible printed circuit.

It should be understood that the driving module in the embodiments of the present disclosure is not limited to the form of the driver chip. For example, the driving module may also be circuits directly formed on the display panel (e.g., the array substrate of the display panel), so that these circuits are used as the driving module as a whole.

In the display panel assembly of the embodiment of the present disclosure, the display panel includes the plurality of data lines, the plurality of sub-pixels 1, a plurality of first multiplexing units, and a plurality of load connection terminals: each first multiplexing unit is coupled to at least two load connection terminals (e.g., two load connection terminals) and at least four data lines (e.g., four data lines): the at least two load connection terminals include a first load connection terminal N11 and a second load connection terminal N12: the at least four data lines include two first data lines S1 coupled to the sub-pixels 1 of a first color, a second data line S2 coupled to the sub-pixels 1 of a second color, and a third data line S3 coupled to the sub-pixels 1 of a third color: the first multiplexing unit is configured to control the first load connection terminal N11 to be electrically coupled to one of the two first data lines S1, and to control the second load connection terminal N12 to be electrically coupled to the second data line S2 or the third data line S3.

Each driving module includes a plurality of data signal generating units for generating data signals, a plurality of second multiplexing units corresponding to the plurality of first multiplexing units and a plurality of signal generating terminals: each second multiplexing unit is coupled to at least two signal generating terminals (e.g., two signal generating terminals) and at least four data signal generating units (e.g., four data signal generating units): the at least two signal generating terminals include a first signal generating terminal N21 and a second signal generating terminal N22: the at least four data signal generating units include two first data signal generating units corresponding to the first data lines S1, a second data signal generating unit corresponding to the second data line S2, and a third data signal generating unit corresponding to the third data line S3: the second multiplexing unit is configured to control the first signal generating terminal N21 to be electrically coupled to one of the two first data signal generating units, and control the second signal generating terminal N22 to be electrically coupled to the second data signal generating unit or the third data signal generating unit.

The first load connection terminal N11 and the second load connection terminal N12, to which the first multiplexing unit is coupled, are electrically coupled to the first signal generating terminal N21 and the second signal generating terminal N22, to which the corresponding second multiplexing unit is coupled, respectively.

Figure 3:
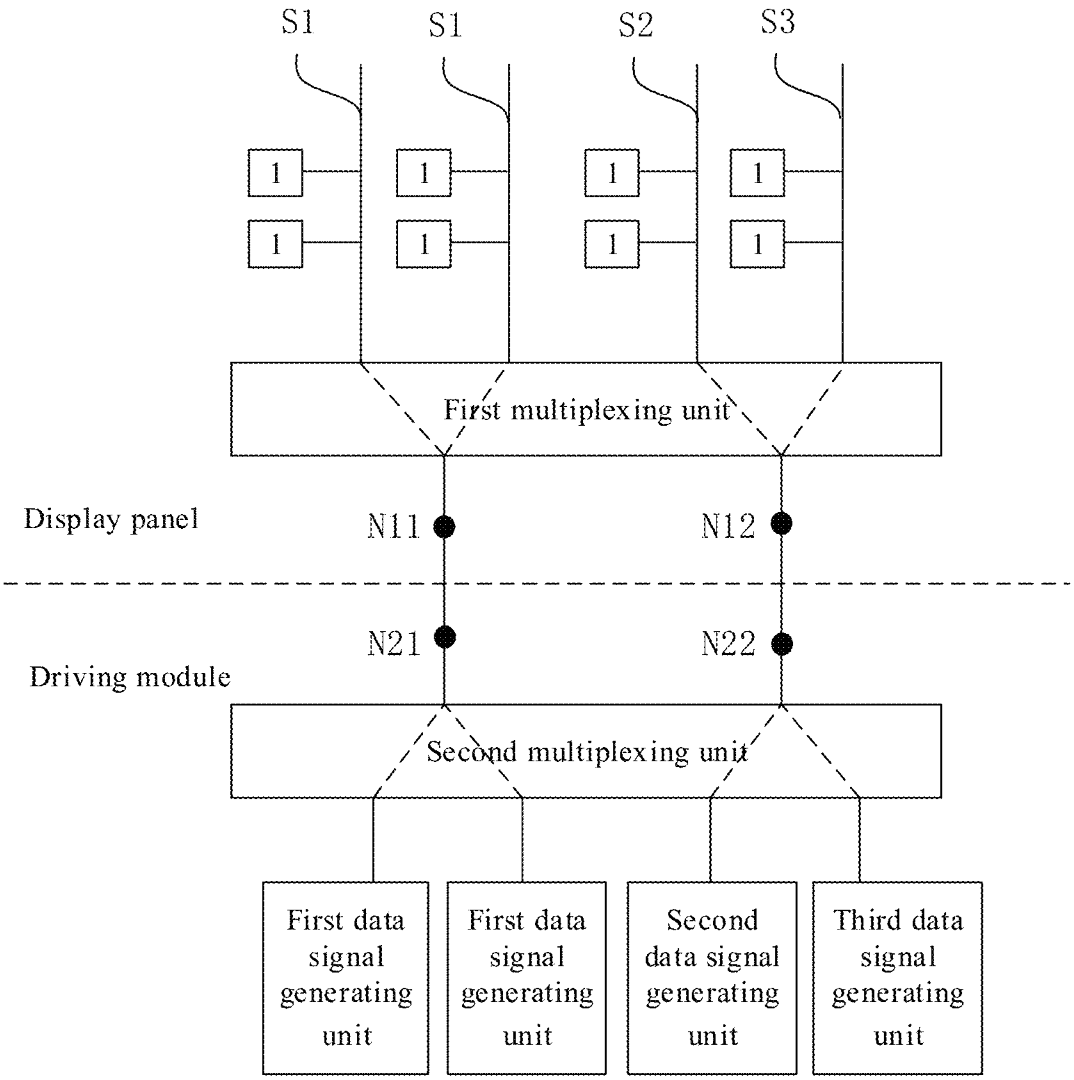
FIG. 3 is another block diagram of a display panel assembly according to an embodiment of the present disclosure.

Referring to FIG. 3, the display panel of the embodiment of the present disclosure includes the plurality of data lines, and each data line is coupled to a plurality of sub-pixels 1 of the same color.

The color of the sub-pixel 1 refers to the color (displayed color) of the light emitted by the sub-pixel, and specifically, the sub-pixel 1 (such as an organic light emitting diode) may directly emit the light of the corresponding color, or the sub-pixel 1 (such as an organic light emitting diode) may originally emit white light, and then the white light is converted into the light of the corresponding color through the filtering of a color filter of the corresponding color.

The sub-pixels 1 of different colors may be combined together to form a "pixel", and the pixels may realize color display as a whole by mixing light.

It should be understood that other structures such as gate lines may also be included in the display panel according to the embodiments of the present disclosure, which are not described in detail herein.

The display panel of the embodiment of the present disclosure further includes the plurality of first multiplexing units (MUXs), and each of the first multiplexing units is coupled to the four data lines (two first data lines S1, one second data line S2, one third data line S3) and the two load connections (one first load connection N11, one second load connection N12).

The first multiplexing unit is configured to switch connection relationships between the load connection terminals and the data lines coupled to the first multiplexing unit. Specifically, the first multiplexing unit selects one of the two first data lines S1 to be electrically coupled to the first load connection terminal N11, and selects one of the second data line S2 and the third data line S3 to be electrically coupled to the second load connection terminal N12.

That is, in the display panel of the embodiment of the present disclosure, the data lines may be divided into a plurality of "groups", each group includes four data lines, wherein two first data lines S1 are coupled to the sub-pixels 1 of the first color, one second data line S2 is coupled to the sub-pixels 1 of the second color, and one third data line S3 is coupled to the sub-pixels 1 of the third color; and the four data lines are used as loads, and the connection relationships between the four data lines and the two load connection terminals (the first load connection terminal N11, the second load connection terminal N12) is selected by the first multiplexing unit, so that each load connection terminal may supply power to one of the two specific data lines under the control of the first multiplexing unit.

In some embodiments, the first color is green.

One of the second color and the third color is red, and the other is blue.

As an implementation of an embodiment of the present disclosure, the above first color may be green (G), and the second color and the third color may be selected from red (R) and blue (B), respectively.

The display panel of the embodiment of the present disclosure may adopt a sub-pixel rendering (SPR) technology, that is, each pixel (or display unit) of the display panel does not include three sub-pixels 1 of three primary colors (such as RGB), whereas each pixel is composed of four sub-pixels 1, specifically, two green (G) sub-pixels 1, one blue (B) sub-pixel 1, and one red (R) sub-pixel 1. By combining these sub-pixels 1 of different colors, a better color display effect can be achieved.

It should be understood that in the display panel of the embodiment of the present disclosure, the specific colors of the sub-pixels 1 are not limited thereto. For example, the number of the blue sub-pixels 1 or the red sub-pixels 1 in each pixel may also be two. For example, the sub-pixels 1 including other color systems may be directly adopted.

In some embodiments, the data lines extend in the column direction.

The data lines are arranged sequentially along the row direction.

The four data lines, to which each first multiplexing unit is coupled, are four adjacent data lines.

As an implementation of the embodiments of the present disclosure, the data lines may extend in the column direction (accordingly, the gate lines may extend in the row direction), so that the plurality of data lines are sequentially arranged in the row direction, and each of the first multiplexing units may be coupled to four data lines adjacent to each other in the row direction, so as to simplify a connection structure as much as possible.

Further, each data line may be coupled to all the sub-pixels 1 in the same column, that is, the color of the sub-pixels 1 in the same column may be the same; and the sub-pixels 1 in two of the four adjacent columns are of the first color (e.g., green), the sub-pixels 1 in one column is of the second color (e.g., red), and the sub-pixels 1 in one column is of the third color (e.g., blue), these sub-pixels 1 correspond to a same first multiplexing unit, and wherein every four adjacent sub-pixels 1 in each row form one pixel.

It should be understood that in the embodiment of the present disclosure, the extending direction of the data lines, the arrangement of the data lines corresponding to each first multiplexing unit, positions where the sub-pixels 1 are coupled to each data line, and the like, are not limited to the above forms.

Figure 4:
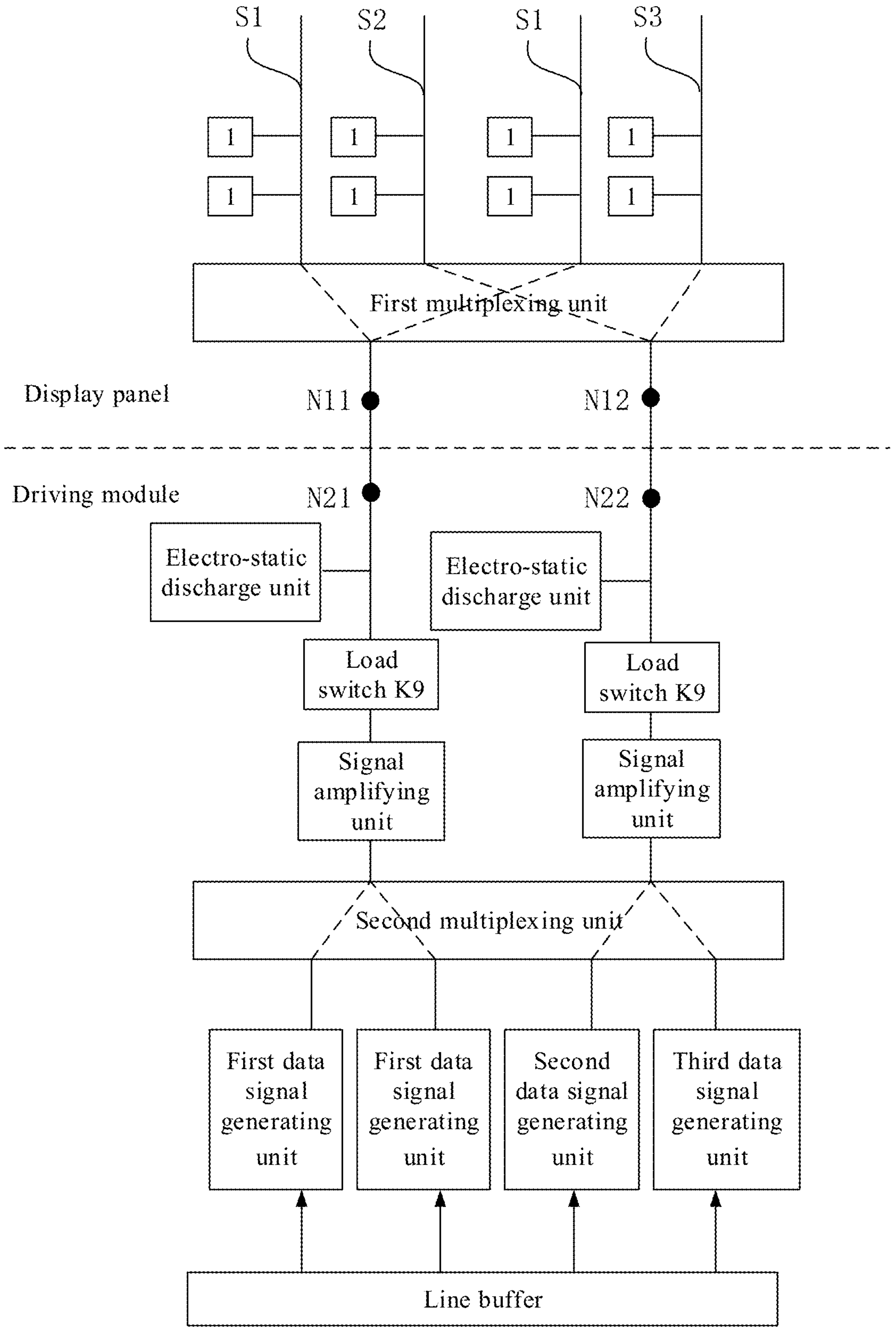
FIG. 4 is another block diagram of a display panel assembly according to an embodiment of the present disclosure.
Figure 5:
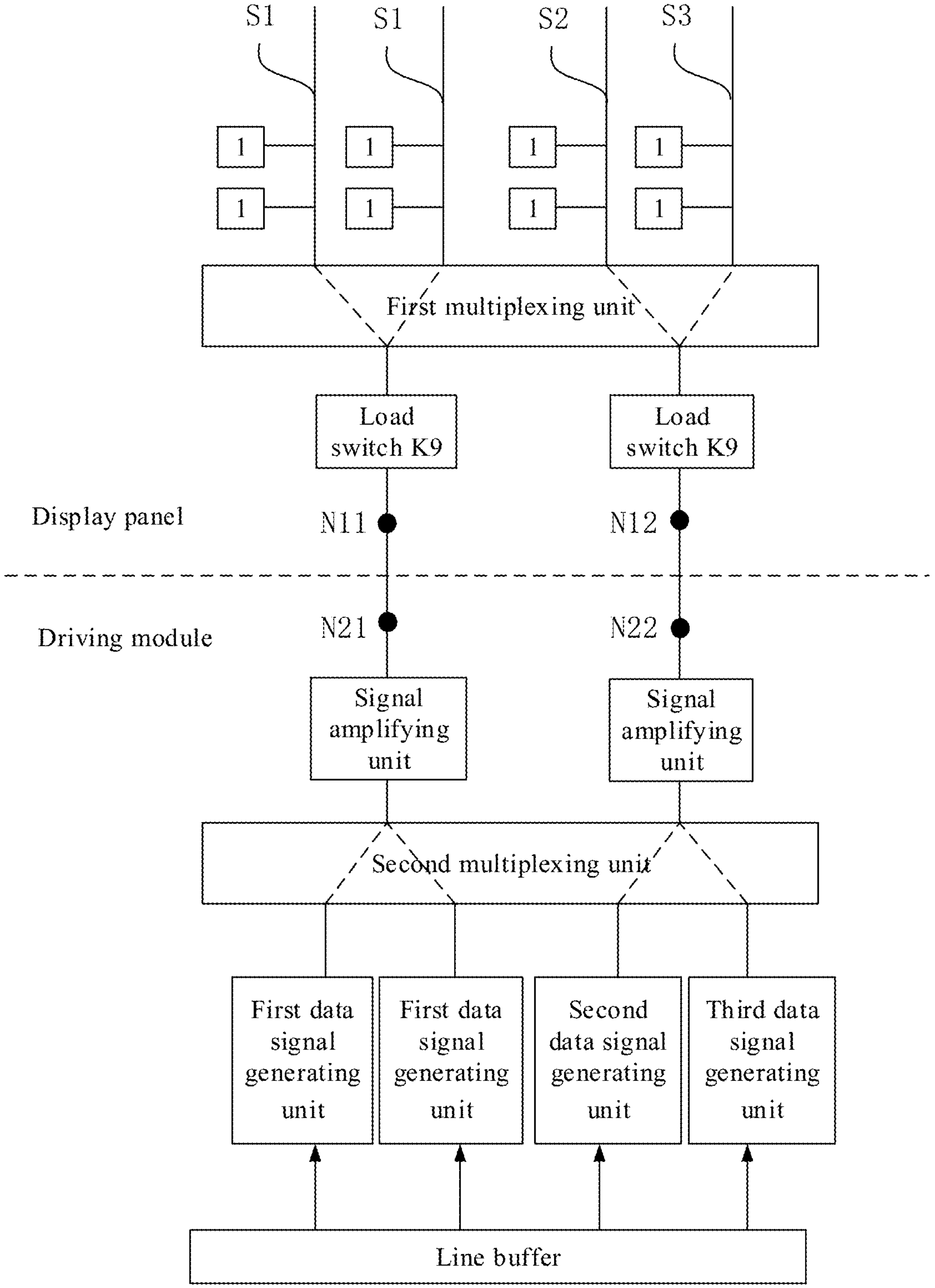
FIG. 5 is another block diagram of a display panel assembly according to an embodiment of the present disclosure.

For example, referring to FIGS. 3 and 5, the two first data lines S1 are arranged adjacent to each other, and the second data line S2 and the third data line S3 are arranged adjacent to each other: alternatively, referring to FIG. 4, the first data lines S1, the second data line S2, and the third data line S3 may be arranged alternately: alternatively, other ways may be used, for example, the second data line S2 and the third data line S3 are sandwiched between the two first data lines S1, or the two first data lines S1 are sandwiched between the second data line S2 and the third data line S3, which will not be described in detail herein.

For example, it is possible that the sub-pixels 1 adjacent to a same data line are located in different columns, so that the orders of the arrangement for the sub-pixels 1 of respective colors in different rows may be different.

Referring to FIG. 3, the driving module (e.g., the data driver chip DIC) according to an embodiment of the present disclosure includes the plurality of data signal generating units for generating data signals (i.e., data voltages VDATA).

Since the sub-pixels 1 of different colors have different structures, materials, and brightness requirements, the specific voltage values of the data signals required by the sub-pixels 1 of different colors are different under the same gray scale (i.e. the same display brightness). Therefore, each data signal generating unit may only be used to supply power to the sub-pixels 1 of a specific color, or each data signal generating unit may only be coupled to a specific kind of data lines.

For example, the data signal generated by the first data signal generating unit in the embodiment of the present disclosure may be only supplied to the first data line S1, the data signal generated by the second data signal generating unit may be only supplied to the second data line S2, and the data signal generated by the third data signal generating unit may be only supplied to the third data line S3.

The data signal generating unit may be a gamma voltage division circuit.

For example, the gamma voltage division circuit includes a plurality of resistors coupled in series to form a resistor string, and both terminals of the resistor string output the gamma high voltage signal and the gamma low voltage signal corresponding to the same color, respectively: resistances of the resistors in the gamma voltage division circuits corresponding to different colors have different distribution, and the specific values of the gamma high voltage signal and the gamma low voltage signal may also be different, so that data signals required by the sub-pixels 1 of the color under different gray scales may be generated among the different resistors through voltage division; therefore, as long as the gray scale (display content data) of the sub-pixel 1 to be charged currently is determined, the gamma voltage division circuit may output the data signal corresponding to the gray scale accordingly.

It should be understood that the specific structure of the gamma voltage division circuit is not limited thereto (e.g., the gamma voltage division circuit may include multi-stage voltage division resistors), and the data signal generating unit is not limited to the form of the gamma voltage division circuit, as long as the data signal generating unit may generate the data signal for the sub-pixels 1 of the corresponding color.

Referring to FIG. 3, the driving module according to the embodiment of the present disclosure includes the plurality of second multiplexing units (MUXs) in one-to-one correspondence with the first multiplexing units. Each of the second multiplexing units is coupled to four data signal generating units (two first data signal generating units, one second data signal generating unit, one third data signal generating unit) and two signal generating terminals (one first signal generating terminal N21, one second signal generating terminal N22).

The first signal generating terminal N21 coupled to the second multiplexing unit is electrically coupled to the first load connection terminal N11, and the first load connection terminal N11 is the first load connection terminal N11 coupled to the first multiplexing unit corresponding to the second multiplexing unit; and the second signal generating terminal N22 coupled to the second multiplexing unit is electrically coupled to the second load connection terminal N12, and the second load connection terminal N12 is the second load connection terminal N12 coupled to the first multiplexing unit corresponding to the second multiplexing unit.

The second multiplexing unit is configured to switch the connection relationship between the signal generating terminals and the data signal generating units coupled to the second multiplexing unit. Specifically, one of the two first data signal generating units is selected to be electrically coupled to the first signal generating terminal N21, and one of the second data signal generating unit and the third data signal generating unit is selected to be electrically coupled to the second signal generating terminal N22.

That is, in the driving module of the embodiment of the present disclosure, the data signal generating units may be divided into a plurality of "groups", each group including four data signal generating units, wherein two first data signal generating units output the generated data signals to the first signal generating terminal N21 according to the selection of the second multiplexing unit, and further transmit the data signals to one first data line S1 through the first load connection terminal N11 and the first multiplexing unit; and the second and third data signal generating units output the generated data signals to the second signal generating terminal N22 according to the selection of the second multiplexing unit, and transmit the data signals to the second data line S2 (for the data signals generated by the second data signal generating unit) or the third data line S3 (for the data signals generated by the third data signal generating unit) through the second load connection terminal N12 and the first multiplexing unit.

In the related art, the data signal generated by one first data signal generating unit may be provided to the two first data lines S1 in the time division multiplexing way by performing the time division multiplexing on one first data signal generating unit.

Obviously, it takes a certain time to obtain the control signal for the data signal generating unit, and to actually generate the data signal by the data signal generating unit according to the control signal. Therefore, in the related art, the time division multiplexing is performed on the first data signal generating unit, so that it takes a long total processing time for the first data signal generating unit to actually generate the data signal and thus, the sub-pixels 1 of the first color cannot be fully charged within a short charging time (Tr).

As can be seen from FIG. 3, in the embodiment of the present disclosure, for every two first data lines S1 in the display panel, two corresponding first data signal generating units are included in the driving module for generating data signals for the two first data lines S1, that is, it is unnecessary to perform the time-division multiplexing on the first data signal generating units in the embodiment of the present disclosure, so that the actual processing time can be reduced (theoretically, half of the original processing time can be reduced), the full charging of the sub-pixels 1, especially the sub-pixels 1 of the first color, is ensured, the display effect is improved, and a basis is provided for improving the refresh rate and the resolution of the display apparatus.

Meanwhile, referring to FIG. 3, in the embodiment of the present disclosure, the second multiplexing units are disposed in the driving module, and the first multiplexing units are disposed in the display panel, so that the second multiplexing units may select the data signals generated by the specific data signal generating units and transmit the data signals to the corresponding load connection terminals, and further, the first multiplexing units may select the data signals and transmit the data signals to the corresponding data lines (corresponding to the sub-pixels 1 of the same color), so as to charge the sub-pixels 1 of the corresponding color.

Therefore, in the prior art, only one mode (R/B or G/G) of outputting and combining the data signals may be configured.

By contrast, in the embodiment of the present disclosure, data remapping may be performed freely on the input sequence of the data signals in each "group" of data lines as required, that is, every two data signals may be combined freely and output in the time division multiplexing way, so as to meet the requirements of various arrangement sequences of the colors of the sub-pixels 1, such as RGBG, GGRB, or the like.

R represents the red sub-pixel 1 or the corresponding data signal, B represents the blue sub-pixel 1 or the corresponding data signal, and G represents the green sub-pixel 1 or the corresponding data signal.

In some embodiments, the second multiplexing unit includes two first multiplexing switches K1, a second multiplexing switch K2, a third multiplexing switch K3: the two first multiplexing switches K1 are coupled between the two first data signal generating units and the first signal generating terminal N21, respectively, the second multiplexing switch K2 is coupled between the second data signal generating unit and the second signal generating terminal N22, and the third multiplexing switch K3 is coupled between the third data signal generating unit and the second signal generating terminal N22.

Figure 6:
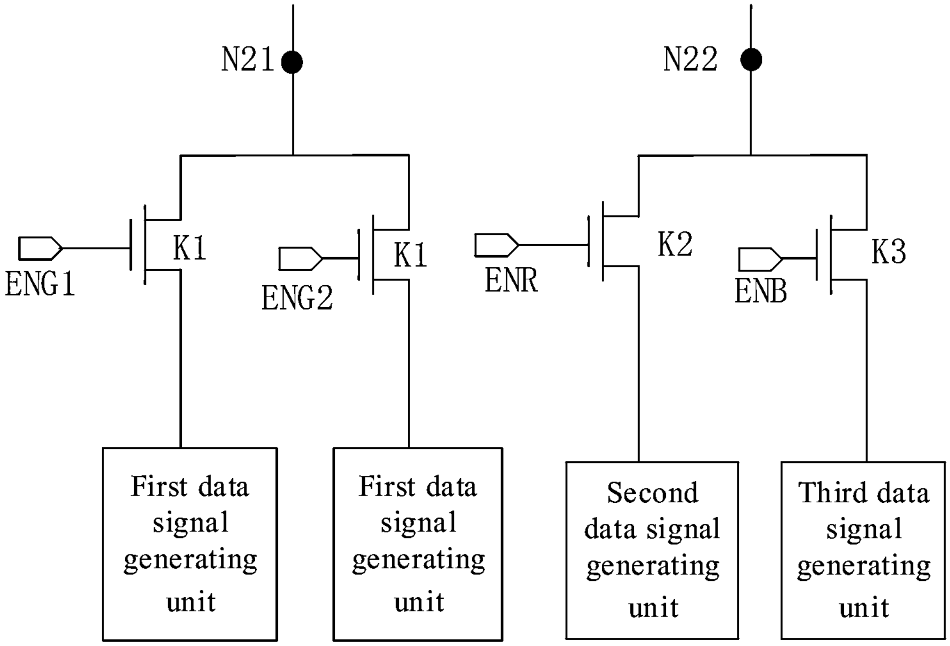
FIG. 6 is a circuit diagram of a second multiplexing unit in another display panel assembly according to an embodiment of the present disclosure.

As an implementation of the embodiment of the present disclosure, referring to FIG. 6, the second multiplexing unit may include four switches, that is, the two first data signal generating units are coupled to the first signal generating terminal N21 through the two first multiplexing switches K1, respectively: the second data signal generating unit and the third data signal generating unit are respectively coupled to the second signal generating terminal N22 through the second multiplexing switch K2 and a third multiplexing switch K3. In this way, the states of the switches are respectively controlled through the four control signals, and the corresponding functions of the second multiplexing unit can be realized.

It should be understood that at any time, one of the two first multiplexing switches K1 should be on and the other should be off, and one of the second multiplexing switch K2 and the third multiplexing switch K3 should be on and the other should be off.

Figure 9:
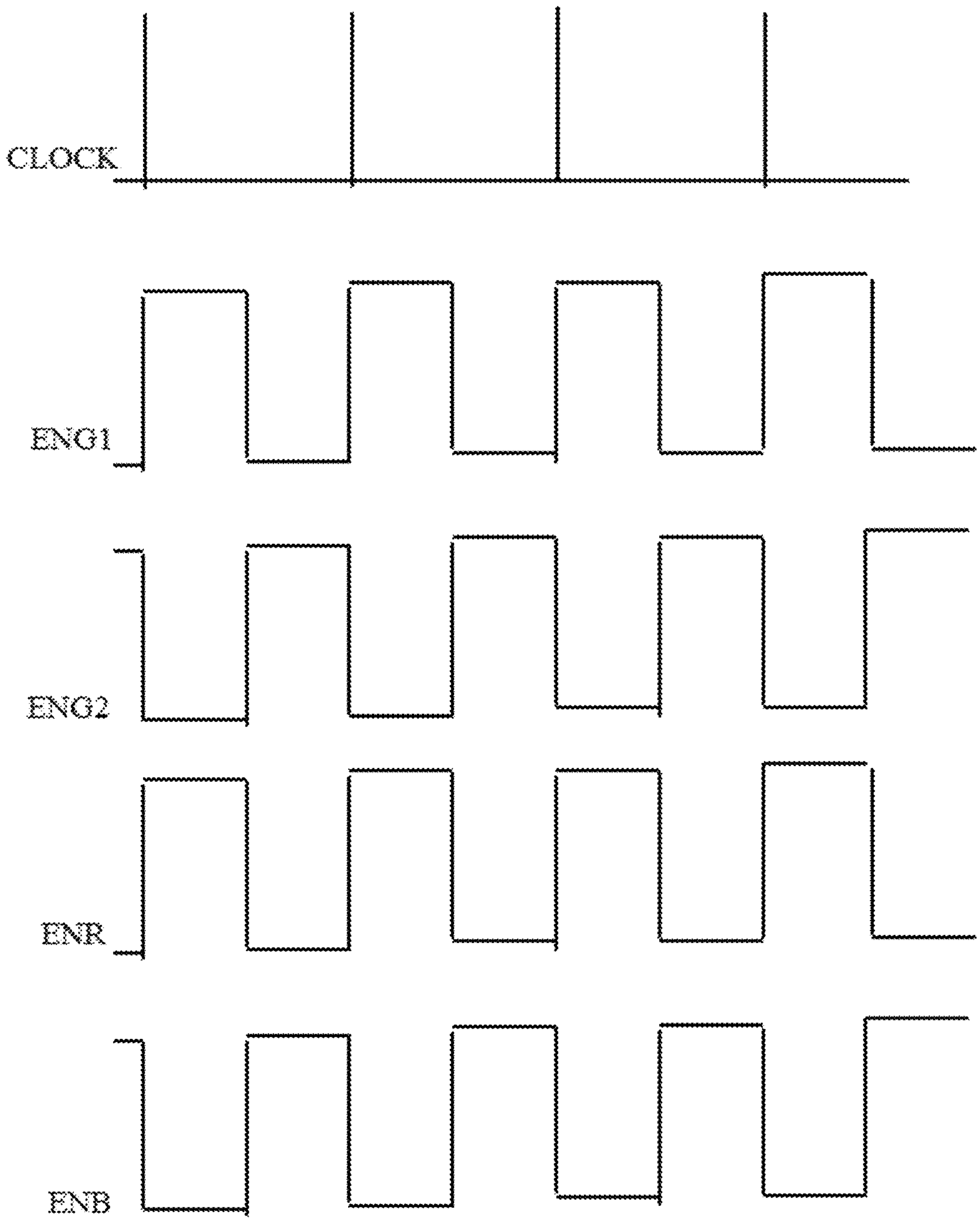
FIG. 9 is a timing diagram for driving a first multiplexing unit in another display panel assembly according to an embodiment of the present disclosure.

Referring to FIG. 6, the above switches may be in the form of transistors, so the control signals may be a signal input to gate electrodes thereof: referring to FIG. 9, a state of each switch can be controlled by a voltage level of each control signal.

In FIGS. 6 and 9, ENG1 and ENG2 respectively indicate control signals corresponding to the two first multiplexing switches K1, ENR indicates a control signal corresponding to the second multiplexing switch K2, ENB indicates a control signal corresponding to the third multiplexing switch K3, and CLOCK indicates a clock signal for each cycle.

It should be understood that the specific form of each switch is not limited to a transistor and will not be described in detail here.

In some embodiments, the first multiplexing unit includes two multiplexing groups, each multiplexing group includes two multiplexing switches K, wherein the two multiplexing switches K of one of the two multiplexing groups are respectively coupled between the first load connection terminal N11 and the two first data lines S1, and the two multiplexing switches K of the other one of the two multiplexing groups are respectively coupled between the second load connection terminal N12 and both of the second and third data lines S2 and S3.

One multiplexing switch K in each multiplexing group is controlled by a first switching control signal, and the other multiplexing switch K is controlled by a second switching control signal.

Figure 7:
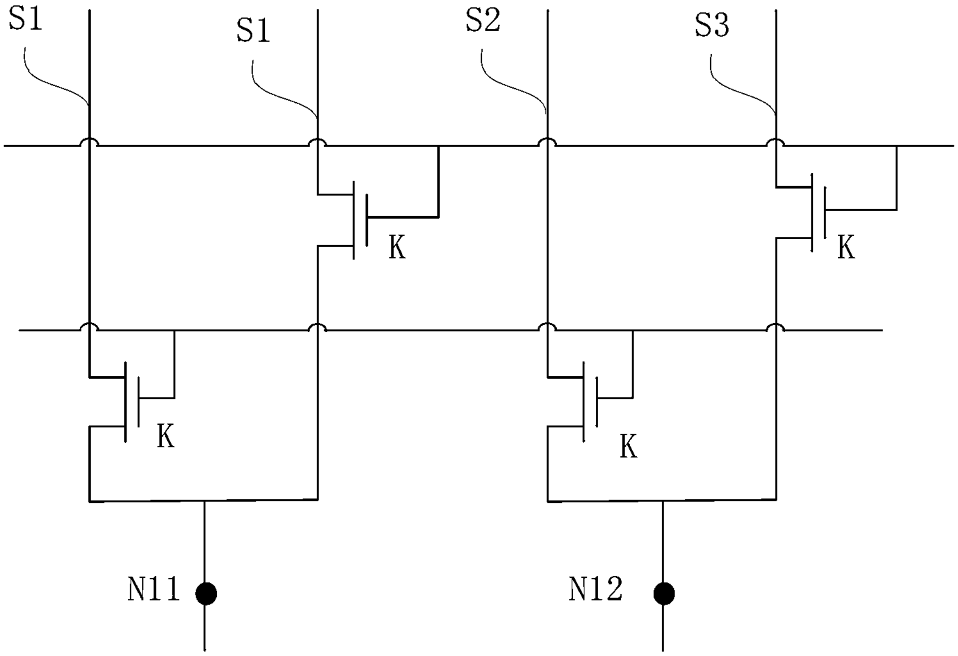
FIG. 7 is a circuit diagram of a first multiplexing unit in another display panel assembly according to an embodiment of the present disclosure.

As an implementation of the embodiment of the present disclosure, referring to FIG. 7, the first multiplexing unit may alternatively include four multiplexing switches K, which are divided into two multiplexing groups, and the two data lines are respectively coupled to one load connection terminal through the two multiplexing switches K of the same multiplexing group.

Unlike the second multiplexing unit, the four multiplexing switches K in the first multiplexing unit are controlled by only two control signals (the first switching control signal and the second switching control signal), i.e. the two multiplexing switches K in each multiplexing group are synchronously controlled by each control signal (because the data signals input to the load connection terminal corresponding to each multiplexing group may already be controlled individually by the second multiplexing unit). For example, referring to FIG. 7, the gate electrodes of the transistors of the multiplexing switches K may be coupled to the corresponding signal lines.

Referring to FIG. 7, the multiplexing switches K may be in the form of transistors, and thus the control signal may be a signal input to the gate electrodes thereof.

It should be understood that the specific form of the multiplexing switches K is not limited to transistors and will not be described in detail here.

In some embodiments, the driving module further includes a line buffer.

The line buffer is configured to control the data signal generating units to generate corresponding data signals according to display content data.

As an implementation of the embodiment of the present disclosure, referring to FIGS. 4 and 5, the driving module may further include the line buffer, and the line buffer may process the data (the display content data) of an image to be displayed in a current frame to obtain the content (such as the gray scale) to be displayed by each sub-pixel 1. For example, the line buffer may perform a buffer and a data remapping on the gray scale of each point in the image: therefore, when any sub-pixel 1 is to be charged, the line buffer may output a corresponding control signal (e.g., a gray scale signal) to a corresponding data signal generating unit (e.g., a gamma voltage division circuit) to control the data signal generating unit to perform analog-to-digital conversion, so as to generate a required data signal (data voltage VDATA), and input the data signal to the corresponding data line and the corresponding sub-pixels 1.

For example, the process of the data remapping by the line buffer may refer to the following table, wherein RGB represents data of the sub-pixels of the corresponding colors, the numbers represent the sequence numbers of the data, and N21 and N22 represent data of the corresponding signal generating terminal.

TABLE 1

Schematic diagram for the process of the data remapping

| Sequence number | N21 | N22 |
|---|---|---|
| Output | G21 | R2 |
| | G22 | B2 |
| Input | G11 | R1 |
| | G11 | B1 |

The specific manner of the data remapping performed by the line buffer may be determined according to the specific arrangement of the sub-pixels 1 in the display panel and the specific format of the display content data, and is not described in detail herein.

In some embodiments, the driving module further includes a plurality of signal amplifying units.

Each signal amplifying unit is configured to amplify the data signal generated by the data signal generating unit.

Referring to FIGS. 4 and 5, in order to improve the driving capability, a signal amplifying unit may be further disposed in the driving module, and be configured to amplify the data signal generated by the data signal generating unit and then input the amplified data signal to the data line.

The signal amplifying unit may be an amplifier or other known devices, and will not be described in detail herein.

In some embodiments, the signal amplifying unit is coupled between the second multiplexing unit and the signal generating terminal.

As an implementation of the embodiment of the present disclosure, the signal amplifying unit may be disposed between an output terminal of the second multiplexing unit and the signal generating terminal, that is, the data signal output by the second multiplexing unit may enter the signal generating terminal and then be transmitted to the data line after being amplified by the signal amplifying unit: therefore, the signal amplifying unit processes the data signals selected by the second multiplexing unit, and thus, only one signal amplifying unit is provided for every two data signal generating units (and corresponding two data lines), thereby reducing the number of the signal amplifying units and simplifying the product structure.

It should be understood that in the embodiment of the present disclosure, each signal generating terminal may be provided with one corresponding signal amplifying unit, so as to ensure that all data signals output by the driving module may be amplified; however, it is also feasible that the driving module is not provided with the signal amplifying unit, or that some signal generating terminals are not provided with corresponding signal amplifying units.

In some embodiments, the display panel assembly of embodiments of the present disclosure further includes a plurality of load switches K9.

The plurality of load switches K9 are coupled between the corresponding signal generating terminals and the corresponding data lines.

The plurality of load switches K9 are configured to control a connection between the corresponding signal generating terminals and the corresponding data lines.

Referring to FIGS. 4 and 5, as a manner of the embodiment of the present disclosure, the display panel assembly further may include the plurality of load switches K9; and the plurality of load switches K9 are coupled between the corresponding signal generating terminals and the corresponding data lines; and configured to control the electrical connection between the corresponding signal generating terminals and the corresponding data lines.

Since the data signal is inputted to the sub-pixels 1 through the data line, when the data signal charges the sub-pixels 1, the entire data line coupled to the sub-pixels 1 is also charged, that is, a voltage of the entire data line is required to reach the voltage of the data signal.

In the related art, in a case where the signal generating terminal is coupled to the data line at all times, the data signal generating unit outputs the data signal to the signal generating terminal, that is, the data signal generating unit directly charges the entire data line, such that the voltage of the entire data line reaches the voltage of the data signal from an initial voltage (e.g., a data voltage remaining at the previous sub-pixels 1).

However, since the data line has a large length and thus, has a large load, the time required to directly charge the data line from the initial voltage to the voltage of the data signal is also long, so that the charging time (Tr) of the sub-pixels 1 is long, the charging speed is slow, and the requirements for high refresh rate and resolution cannot be satisfied.

In the embodiment of the present disclosure, the load switches K9 are disposed between the signal generating terminals and the data lines, and the load switch K9 may be turned off when (or slightly before) the data signal generating units start to output the data signals, so that the data signal generating units charge only the signal generating terminals at the beginning, rather than the main load (the data lines). The number of circuit structures provided between the data signal generating units and the signal generating terminals is very small and the load is almost negligible, so the charging process may be regarded as "no load" and may be completed quickly: when (or slightly after) the signal generating terminals are charged to the voltage of the data signal, the load switches K9 may be turned on again to couple the signal generating terminals to the load (the data lines), i.e., the data signal generating units start to charge the data lines "on-load", which is equivalent to a case where the data signal generating units start to charge the data lines from the voltage of the data signal, the charging process can also be completed quickly.

Thus, by providing the load switches K9 as above, the actual charging time (Tr) of the sub-pixels 1 can be greatly shortened, thereby providing a basis for improving the refresh rate and resolution of the display apparatus.

The load switches K9 may be in the form of transistors, so that the control of the load switches K9 may be realized by a signal input to the gate electrodes thereof.

Figure 10:
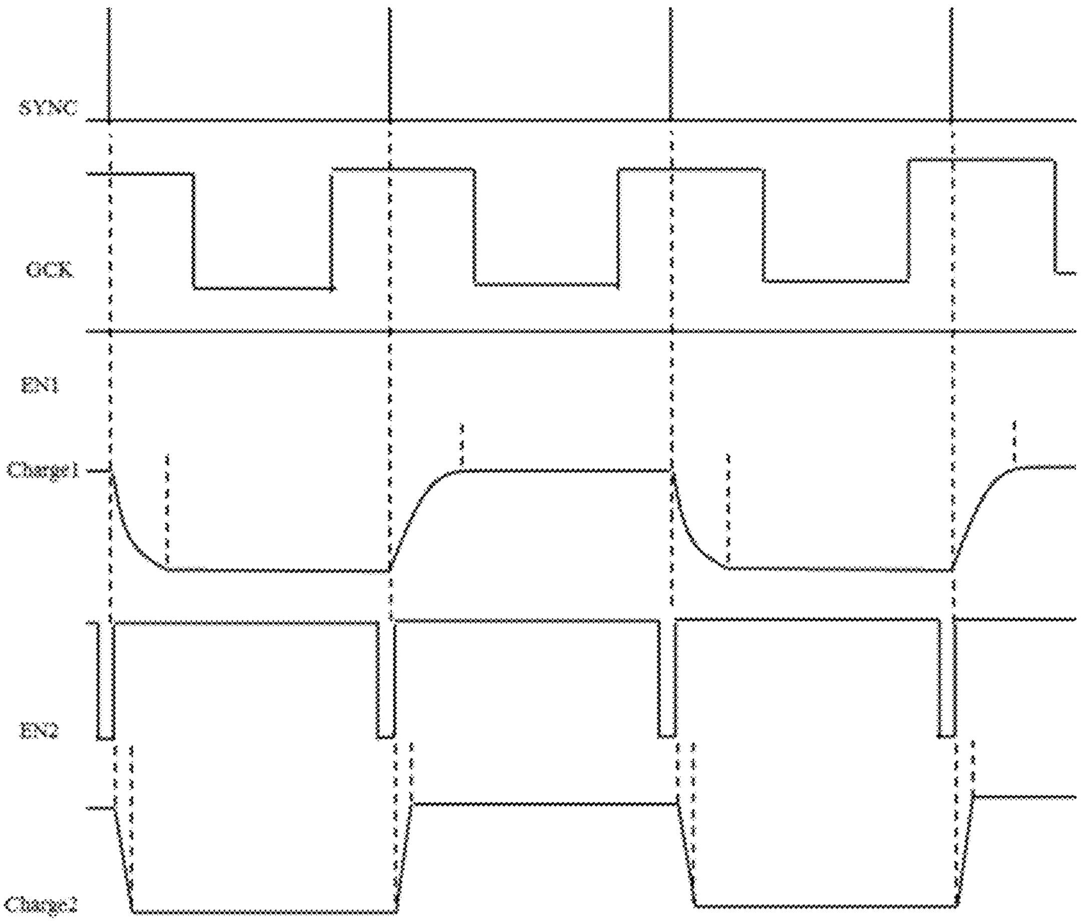
FIG. 10 is a driving timing diagram for the charging of a sub-pixel in another display panel assembly according to an embodiment of the present disclosure.
Figure 11:
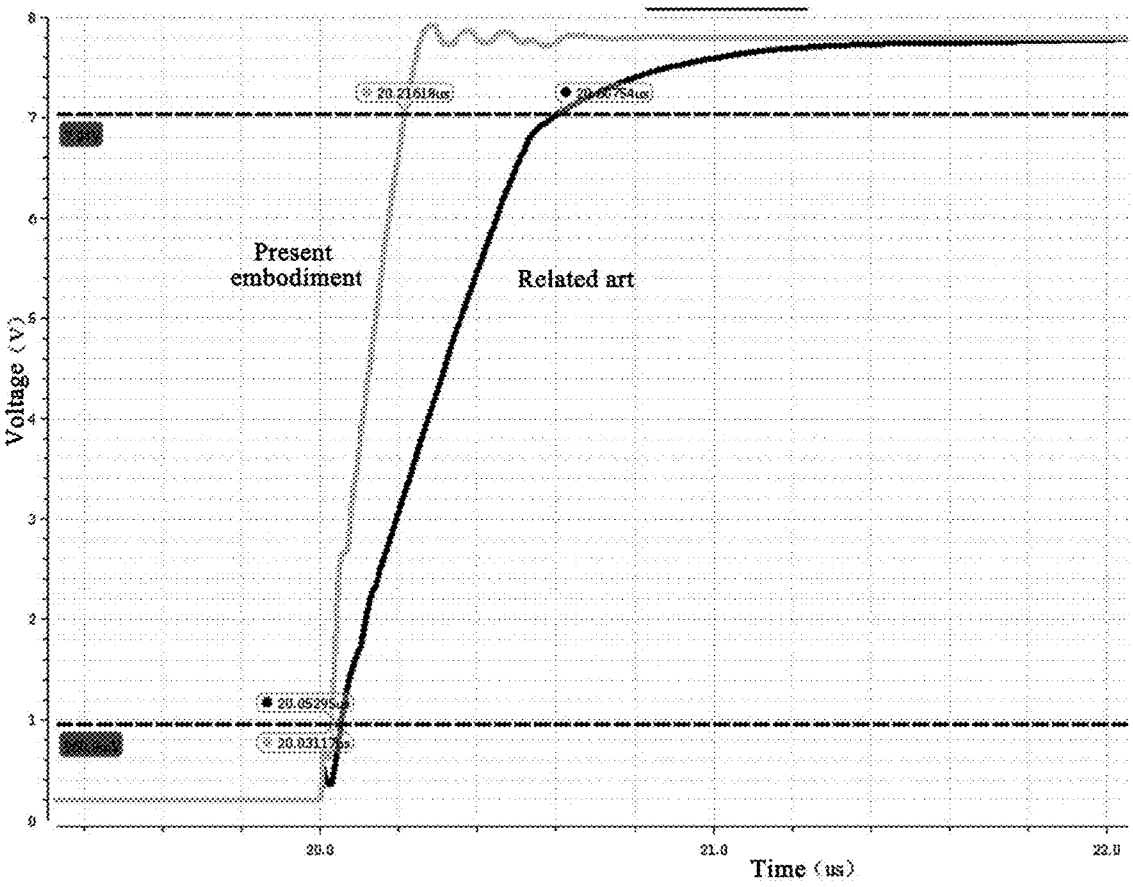
FIG. 11 is a diagram illustrating charging effects of a display panel assembly according to an embodiment of the present disclosure and a display panel assembly in the related art.

For example, referring to FIGS. 10 and 11, in the display panel assembly, when the load switches K9 are always turned on (i.e. which is equivalent to without the load switch K9) (see EN1 and Charge1 in FIG. 10), which is equivalent to always being "on-load" charging, the charging time (Tr) of one sub-pixel 1 is more than 600 ns: when the load switches K9 are turned off firstly and then turned on (see EN2 and Charge2 in FIG. 10), which is equivalent to being "no load" charging and then "on-load" charging, the time of "no load" charging is only about 150 ns (that is, the duration of the load switch K9 in the off state), and the time of "on-load" charging is only less than 300 ns, so the total charging time of the sub-pixels 1 is also greatly shortened.

In FIG. 10, EN1 and EN2 respectively represent control signals for the load switches K9 without or with the load switches K9: Charge1 and Charge2 indicate changes in voltage in the sub-pixels without or with the load switches K9 (charging condition), respectively: GCK denotes a gate line signal: SYNC denotes an initialization signal (a signal at the moment of the signal refresh) that triggers the charging.

In FIG. 11, curves of "the embodiment of the present disclosure" and "the related art" respectively show changes in voltage in the charged sub-pixels with time (charging condition).

It should be understood that the specific form of the above load switches K9 is not limited to a transistor and will not be described in detail herein.

Further, according to the above manner, when the load switches K9 are turned off, the data signal generating units do not have any actual influence on the data lines regardless of the output signals.

Therefore, with the above load switches K9, during the charging process of each sub-pixel 1, the data signal generating units may actually start to output the data signals corresponding to the sub-pixel 1 "in advance". For example, the data signal generating units may start to output the data signal corresponding to the sub-pixel 1 in the switching time period after the charging of the previous sub-pixel 1 is completed, and when the sub-pixel 1 is to be charged, the load switches K9 are turned on, and the charging of the sub-pixel 1 is started immediately.

That is, the above "no load" charging time may not actually be included in the total charging time (Tr) for the sub-pixels 1, i.e., the total charging time for the sub-pixels 1 may actually be the "on-load" charging time, thereby shortening the charging time to a greater extent.

For example, according to the above example of FIG. 10, the actual total charging time for the sub-pixels 1 may be less than 300 ns, less than half the charging time required in the related art.

In some embodiments, all of the load switches K9 are controlled by one load control signal.

As one implementation of the embodiment of the present disclosure, the signal generating terminals of the driving module are generally configured to synchronously charge the plurality of sub-pixels 1. Therefore, for convenience of management, all the load switches K9 may be controlled by one control signal (the load control signal). For example, referring to FIG. 8, the gate electrodes of the transistors of all the load switches K9 are coupled to a same signal line.

It should be understood that in the embodiment of the present disclosure, each signal generating terminal may be provided with a corresponding load switch K9, so as to ensure that the above charging process of "no load" followed by "on-load" may be performed on all data signals output by the driving module: however, it is also feasible that no load switch is provided in the driving module, or that no corresponding load switch is provided at a part of the signal generating terminals.

In some embodiments, the load switches K9 are coupled between the signal generating terminals and the load connection terminals.

As an implementation of the embodiment of the present disclosure, referring to FIGS. 4 and 5, the load switches K9 may be disposed between the signal generating terminals and the load connection terminals, so that each load switch K9 may correspond to two data lines, thereby reducing the number of load switches K9 and simplifying the product structure.

It should be understood that it is also possible to provide the load switches K9 at other locations, for example, provide the load switches K9 between the data lines and the corresponding load connection terminals.

In some embodiments, the driving module is a driver chip, and the load switches K9 are disposed in the driver chip.

The driver chip includes a plurality of output ports: the signal generating terminals are coupled to the output ports through the load switches K9.

Referring to FIG. 4, as an implementation of the embodiment of the present disclosure, when the driving module is in the form of the driver chip, the load switches K9 may be directly integrated inside the driver chip, that is, the load switches K9 are disposed between the signal generating terminals and actual output ports (e.g., pins) of the driver chip (alternatively, between the signal amplifying units and the output ports).

As described above, the output ports of the driver chip should be electrically coupled (e.g., directly bonded and electrically coupled, or indirectly electrically coupled through a flexible printed circuit (FPC)) to the input connectors (e.g., pads) of the display panel, so as to achieve the electrical connection between the corresponding signal generating terminals and the load connection terminals, and thus the load switches K9 are provided at the above positions, that is, between the signal generating terminals and the load connection terminals.

In some embodiments, the driver chip further includes a plurality of electro-static discharge units.

Each electro-static discharge unit is used for preventing the signal of the output port from being reversely transmitted to the load switch K9.

As one implementation of the embodiment of the present disclosure, referring to FIG. 4, when the load switches K9 are disposed in the driver chip, the plurality of electro-static discharge units (ESD) unit may be disposed in the driver chip, in order to avoid the following problem: the signals in the display panel "flow back" from the output ports to the inside of the driver chip due to the accumulation of static electricity at the moment when the load switches K9 are turned on, which damages the circuit structure of the driver chip.

In some embodiments, each electro-static discharge unit includes a first diode D1 and a second diode D2: an anode of the first diode D1 is coupled to a low voltage signal terminal (shown by GND in FIG. 8), and a cathode of the first diode D1 is coupled to the output port: a cathode of the second diode D2 is coupled to a high voltage signal terminal (AVDD in FIG. 8), and the anode of the second diode D2 is coupled to the output port.

Figure 8:
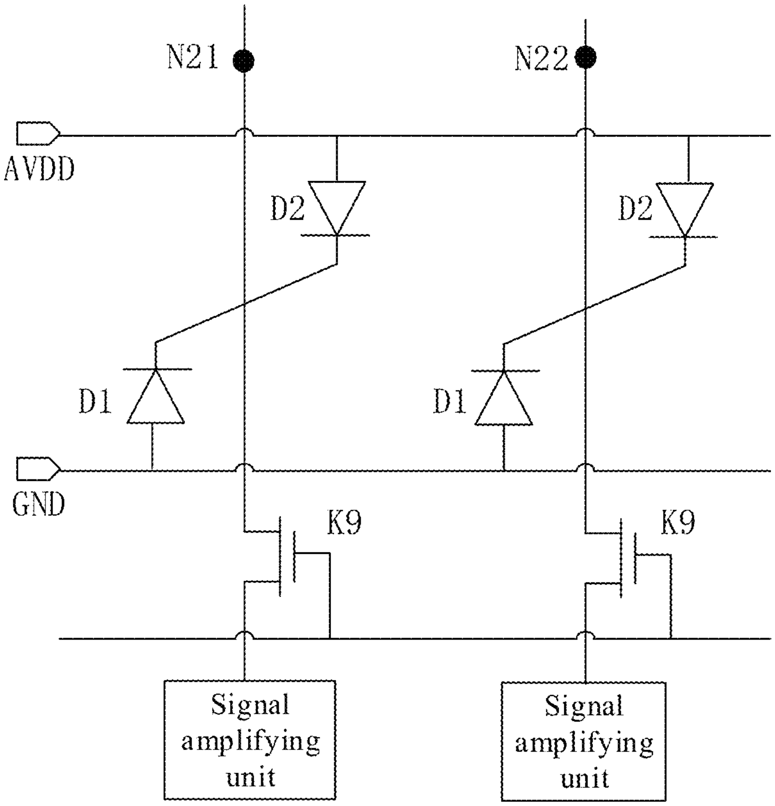
FIG. 8 is a circuit diagram of a load switch and an electro-static discharge unit in another display panel assembly according to an embodiment of the present disclosure.

Further, referring to FIG. 8, each electro-static discharge unit may include two diodes (the first diode D1 and the second diode D2), wherein the anode of the first diode D1 is supplied with the low voltage signal, the cathode of the first diode D1 is coupled to the output port of the driver chip, the cathode of the second diode D2 is supplied with the high voltage signal, and the anode of the second diode D2 is coupled to the output port of the driver chip (i.e., coupled to the anode of the first diode D1).

It should be understood that the specific form of the electro-static discharge unit (ESD) is not limited to the above examples, and the electro-static discharge unit may have any other circuit structure capable of preventing the signals from "flowing backwards".

In some embodiments, the load switches K9 are provided in the display panel: the display panel includes a plurality of input connectors: the load connection terminal is coupled to the corresponding input connector through the corresponding load switch K9.

Alternatively, referring to FIG. 5, as another mode of the embodiment of the present disclosure, the load switches K9 may also be disposed in the display panel (e.g., disposed on the array substrate of the display panel), that is, the load switches K9 may be disposed between the input connectors (e.g., pads) and the load connection terminals of the display panel, that is, between the signal generating terminals and the load connection terminals.

It should be understood that it is also possible to provide the load switches K9 at other positions such as on the flexible printed circuit (FPC) so long as the load switches K9 are coupled between the signal generating terminals and the data lines.

In a second aspect, referring to FIGS. 1 to 12, an embodiment of the present disclosure provides a driving method for a display panel assembly, and the display panel assembly is the display panel assembly of any one of the embodiments of the present disclosure.

The embodiment of the present disclosure provides a method for driving the above display panel assembly, thereby implementing the display.

Figure 12:
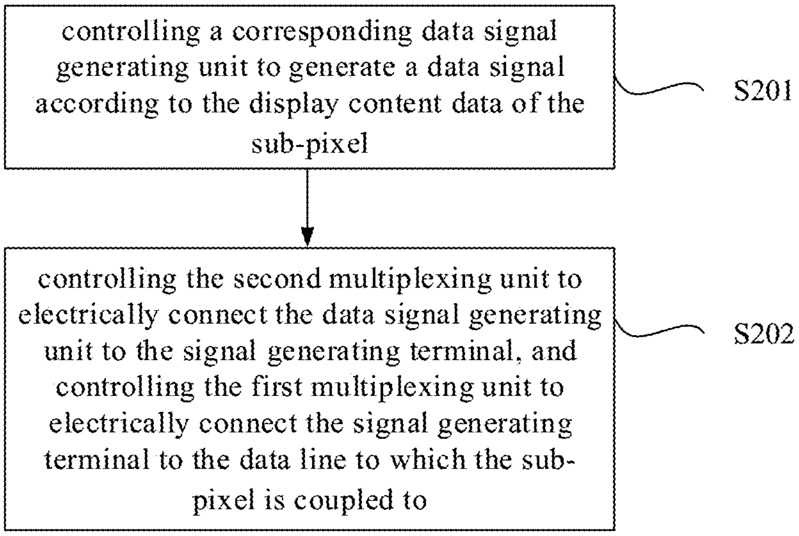
FIG. 12 is a flowchart illustrating a driving method for a display panel assembly according to an embodiment of the present disclosure.

Referring to FIG. 12, in the driving method for the display panel assembly according to the embodiment of the present disclosure, the process of inputting a data signal to any sub-pixel 1 includes:

S201, controlling a corresponding data signal generating unit to generate a data signal according to the display content data of the sub-pixel 1.

S202, controlling the second multiplexing unit to electrically couple the data signal generating unit to the signal generating terminal, and controlling the first multiplexing unit to electrically couple the signal generating terminal to the data line coupled to the sub-pixel 1.

When the display panel assembly displays each frame, a data signal needs to be input to each sub-pixel 1, so that the sub-pixel 1 continuously displays the required content in the frame according to the data signal.

According to the driving method for the display panel assembly of the embodiment of the present disclosure, in the process of inputting the data signal to any sub-pixel 1, the corresponding data signal generating unit (the data signal generating unit for the same color coupled to the sub-pixel 1) is controlled, according to the display content data of the sub-pixel 1 (for example, the gray scale of the sub-pixel 1 in the current frame), to generate the corresponding data signal. For example, the line buffer may perform a buffer and a data remapping on the gray scale of each point in the image to be displayed in the current frame, to obtain the gray scale of the sub-pixel 1; and when the sub-pixel 1 is to be charged, the gray scale is output as the control signal to the corresponding data signal generating unit (e.g., the gamma voltage division circuit), such that the data signal generating unit generates the data signal.

Correspondingly, the second multiplexing unit may be controlled to electrically couple the data signal generating unit with the signal generating terminal, and the first multiplexing unit may be controlled to electrically couple the signal generating terminal with the data line coupled to the sub-pixel 1, so that the data signal generated by the data signal generating unit is transmitted to the sub-pixel 1 sequentially through the second multiplexing unit, the signal generating terminal (output port), the load connection terminal (input connector), the first multiplexing unit and the data line, to charge the sub-pixel 1, so as to realize the display.

The process of inputting the data signal to one sub-pixel 1 is described as above. In order to form a complete picture and a continuous display, it is usually necessary to perform multi-frame continuous display in the display panel assembly, and it is necessary to input data signals to different sub-pixels 1 (e.g. sub-pixels 1 in different rows) in each frame at different time, and it is necessary to simultaneously input data signals to multiple sub-pixels 1 (e.g. multiple sub-pixels 1 in the same row) at each time. It should be understood that the process of inputting the data signal to any sub-pixel 1 may be performed in the above manner.

It should be understood that the above sequence of step S201 and step S202 does not represent the necessary execution sequence thereof, as long as the steps of the driving method of the embodiment of the present disclosure are actually performed (for example, step S201 and step S202 may actually be performed at the same time) in the process of inputting the data signal to any sub-pixel 1.

In some embodiments, the display panel assembly is a display panel assembly provided with the load switches K9: the driving method of the embodiment of the present disclosure further includes:

- when or before the data signal generating units start to generate the data signal, controlling the load switches K9 to be turned off; and
- when or after the voltage of the signal generating terminals reaches the voltage of the data signal, controlling the load switches K9 to be turned on.

As described above, referring to FIG. 9, when the above load switches K9 are provided in the display panel assembly, the load switches K9 may be controlled to be turned off when (or slightly before) the data signal generating units start to generate the data signals; and to be turned on when (or slightly after) the signal generating terminals are charged to the voltage of the data signal by the data signal generating units in the "no load" state, so that the data lines and the sub-pixels 1 are charged "on-load".

In some embodiments, the data signal is input to any sub-pixel 1 at a predetermined moment of the signal refresh.

The data signal generating units start to generate the data signal at a predetermined time before the moment of the signal refresh, so that the voltage at the signal generating terminals reaches the voltage of the data signal at or before the moment of the signal refresh.

As described above, as a way of an embodiment of the present disclosure, when the load switches K9 are provided in the display panel assembly, the data signal generating unit may be controlled to start to generate the data signal and charge the signal generating terminal in the "no load" state in an "advanced" predetermined time (during which the load switches K9 should be controlled to be turned off) before actually starting to charge the sub-pixel 1 (before the moment of the signal refresh), to further shorten the actual charging time (Tr) for the sub-pixel 1.

It will be understood that the predetermined time may be selected as desired, a longer predetermined time affects the process for charging the previous sub-pixel 1, a shorter predetermined time causes the "no load" charging to be incomplete when the moment of the signal refresh arrives. For example, the predetermined time may be the duration of a predetermined "no load" charging, such as 150 ns above.

Figure 13:
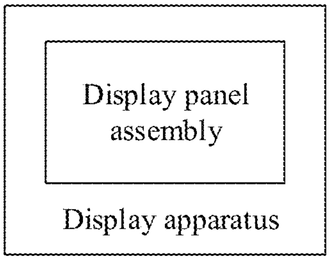
FIG. 13 is a block diagram of a display apparatus according to an embodiment of the present disclosure.

In a third aspect, referring to FIG. 13, an embodiment of the present disclosure provides a display apparatus, including the display panel assembly of any one of the embodiments of the present disclosure.

The display panel assembly of embodiments of the present disclosure may be combined with other devices, such as a housing, a power supply, etc., to form a fully functional, stand-alone display apparatus.

For example, the display panel in the display apparatus may be any form of an organic light emitting diode (OLED)

display panel, a liquid crystal display panel (LCD), or the like; the display apparatus may be any product or component with a display function, such as an electronic paper, a mobile phone, a tablet computer, a television, a display, a notebook computer, a digital photo frame, a navigator or the like.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display panel assembly, comprising a display panel and a plurality of driving devices; wherein the display panel comprises a plurality of data lines, a plurality of sub-pixels, a plurality of first multiplexers, and a plurality of load connection terminals; each first multiplexer is coupled to at least two load connection terminals and at least four data lines; the at least two load connection terminals comprise a first load connection terminal and a second load connection terminal; the at least four data lines comprise two first data lines coupled to sub-pixels of a first color, a second data line coupled to sub-pixels of a second color, and a third data line coupled to sub-pixels of a third color; the first multiplexer is configured to control the first load connection terminal to be electrically coupled to one of the two first data lines, and to control the second load connection terminal to be electrically coupled to the second data line or the third data line;

each driving device comprises a plurality of data signal generators configured to generate data signals, a plurality of second multiplexers corresponding to the plurality of first multiplexers and a plurality of signal generating terminals; each second multiplexer is coupled to at least two signal generating terminals and at least four data signal generators; the at least two signal generating terminals comprise a first signal generating terminal and a second signal generating terminal; the at least four data signal generators comprise two first data signal generators corresponding to the first data lines, a second data signal generator corresponding to the second data line, and a third data signal generator corresponding to the third data line; the second multiplexer is configured to control the first signal generating terminal to be electrically coupled to one of the two first data signal generators, and to control the second signal generating terminal to be electrically coupled to the second data signal generator or the third data signal generator; and the first load connection terminal and the second load connection terminal, to which the first multiplexer is coupled, are electrically coupled to the first signal generating terminal and the second signal generating terminal, to which the corresponding second multiplexer is coupled, respectively.

2. The display panel assembly of claim 1, wherein each second multiplexer comprises two first multiplexing switches, a second multiplexing switch, and a third multiplexing switch; the two first multiplexing switches are coupled between the two first data signal generators and the first signal generating terminal, respectively; the second multiplexing switch is coupled between the second data signal generator and the second signal generating terminal, and the third multiplexing switch is coupled between the third data signal generator and the second signal generating terminal.

3. The display panel assembly of claim 1, wherein each first multiplexer comprises two multiplexing groups, each multiplexing group comprises two multiplexing switches, the two multiplexing switches of one of the two multiplexing groups are respectively coupled between the first load connection terminal and the two first data lines, and the two multiplexing switches of the other of the two multiplexing groups are respectively coupled between the second load connection terminal and the second and third data lines; and in each multiplexing group, one of the two multiplexing switches is controlled by a first switching control signal, and the other of the two multiplexing switches is controlled by a second switching control signal.

4. The display panel assembly of claim 1, wherein each driving device further comprises a line buffer; and the line buffer is configured to control the data signal generators to generate corresponding data signals according to display content data.

5. The display panel assembly of claim 1, wherein each driving device further comprises a plurality of signal amplifiers; and the plurality of signal amplifiers are configured to amplify data signals generated by the data signal generators.

6. The display panel assembly of claim 5, wherein the plurality of signal amplifiers are coupled between the second multiplexer and the signal generating terminals.

7. The display panel assembly of claim 1, further comprising a plurality of load switches;

the plurality of load switches are coupled between the signal generating terminals and the corresponding data lines; and the plurality of load switches are configured to control the signal generating terminals to be electrically coupled to the corresponding data lines.

8. The display panel assembly of claim 7, wherein the plurality of load switches are coupled between the signal generating terminals and the corresponding load connection terminals.

9. The display panel assembly of claim 8, wherein the plurality of load switches are in a driver chip; and the driver chip comprises a plurality of output ports; the signal generating terminals are coupled to the plurality of output ports through the plurality of load switches.

10. The display panel assembly of claim 9, wherein the driver chip further comprises a plurality of electro-static discharge elements; and the plurality of electro-static discharge elements are configured to prevent signals of the plurality of output ports from being reversely transmitted to the plurality of load switches.

11. The display panel assembly of claim 10, wherein each electro-static discharge element comprises a first diode and a second diode; an anode of the first diode is coupled to a low voltage signal terminal, and a cathode of the first diode is coupled to the output port; a cathode of the second diode is coupled to a high voltage signal terminal, and an anode of the second diode is coupled to the output port.

12. The display panel assembly of claim 8, wherein the plurality of load switches are in the display panel; and the display panel comprises a plurality of input connectors; the load connection terminals are coupled to the plurality of input connectors through the plurality of load switches.

13. The display panel assembly of claim 7, wherein all the load switches are controlled by one load control signal.

14. The display panel assembly of claim 1, wherein the first color is green; and one of the second color and the third color is red, and the other one is blue.

15. The display panel assembly of claim 1, wherein the plurality of data lines extend in a column direction;

the plurality of data lines are arranged sequentially along a row direction; and the four data lines, to which each first multiplexer is coupled, are four adjacent data lines.

16. The display panel assembly of claim 1, wherein the display panel is an organic light emitting diode display panel.

17. A method for driving a display panel assembly, wherein the display panel assembly is the display panel assembly of claim 1; and the method comprises inputting a data signal to a sub-pixel;

wherein inputting the data signal to the sub-pixel comprises:

controlling a corresponding data signal generator to generate a data signal according to display content data of the sub-pixel; and controlling a second multiplexer to electrically couple the corresponding data signal generator to a signal generating terminal, and controlling a first multiplexer to electrically couple the corresponding signal generating terminal to a data line to which the sub-pixel is coupled.

18. The method of claim 17, wherein the display panel assembly further comprises a plurality of load switches; the plurality of load switches are coupled between the signal generating terminals and the corresponding data lines; and the plurality of load switches are configured to control the signal generating terminals to be electrically coupled to the corresponding data lines; and the method further comprises:

controlling the load switches to be switched off when or before the data signal generators start to generate the data signals; and controlling the load switches to be turned on when or after a voltage of the signal generating terminals reaches a voltage of the data signal.

19. The method of claim 18, wherein the data signal is input to the sub-pixel at a predetermined signal refresh timing; and the data signal generator starts to generate the data signal at a predetermined time before the signal refresh timing, so that a voltage at the signal generating terminal reaches the voltage of the data signal at or before the signal refresh timing.

20. A display apparatus, comprising a display panel assembly, wherein the display panel assembly is the display panel assembly of claim 1.

* * * * *